Aug. 2, 1938.  J. TENBROOK  2,125,595
GOPHER TRAP
Filed Jan. 26, 1937
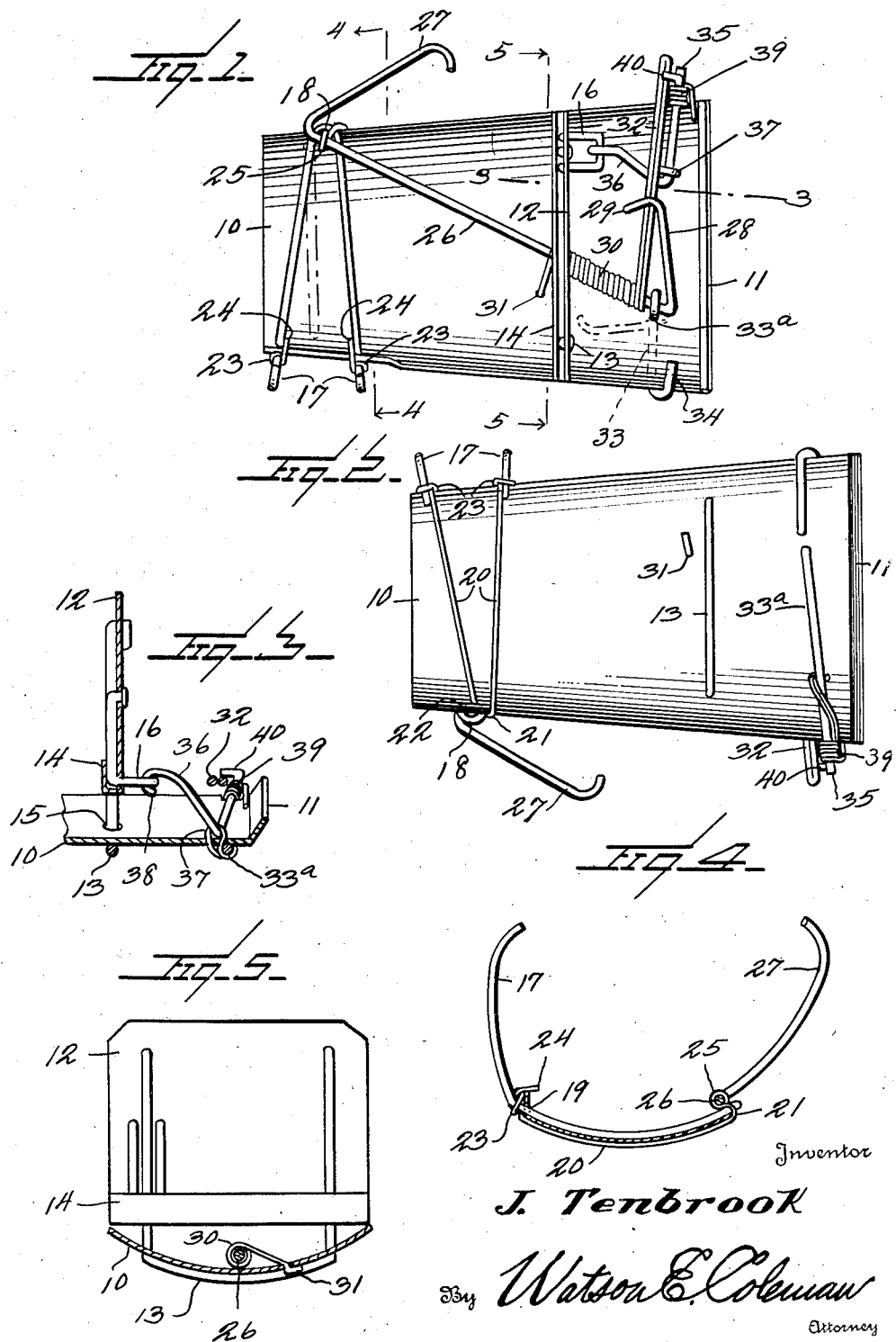

Patented Aug. 2, 1938

2,125,595

UNITED STATES PATENT OFFICE 2,125,595

GOPHER TRAP

John Tenbrook, Sepulveda, Calif.

Application January 26, 1937, Serial No. 122,428

10 Claims. (Cl. 43—81)

This invention relates to traps and particularly to traps intended to be placed within the entrances of burrows or holes, such traps being particularly used in trapping pocket gophers and like animals.

The general object of this invention is to provide a trap of this character which is very simple, can be cheaply made, and which may be adjusted to suit the size of a gopher hole.

Another object is to provide a trap which takes advantage of the fact that gophers entering their burrows tend to push against any obstruction, the trap, therefore, being provided with a trigger releasing plate which is disposed in a vertical position and which releases the trigger and permits the trap to spring when the animal pushes his nose against the trigger plate.

A further object is to so construct the trap that the opposed jaws of the trap need only be adjusted to open or catching position after the trigger mechanism of the trap has been set and the trap placed in position, thus eliminating any chance of a person setting the trap in place having his fingers caught or pierced by the sharp-pointed jaws upon the trap being accidently sprung.

A still further object is to provide a trap of this character having a base plate which is transversely curved to conform to the curvature of the gopher hole and which is adapted to be covered with earth when the trap is inserted in the hole.

A further object is to provide a trap of this character in which there are fixed jaws and a movable jaw and in which the movable jaw need only be partly opened or, in other words, need only be opened to an extent permitted by the size of the hole or borrow.

Still another object is to provide two small prongs at the entrance end of the base plate which will tend to prevent the animal, after the trap is sprung, from releasing himself.

Other objects will appear in the course of the following description.

In the drawing:

Figure 1 is a top plan view of my gopher trap in set position.

Figure 2 is an underside plan view thereof.

Figure 3 is a fragmentary section on the line 3—3 of Figure 1.

Figure 4 is a section on the line 4—4 of Figure 1.

Figure 5 is a section on the line 5—5 of Figure 1.

Referring to the drawing, 10 designates a base plate which may be made of sheet metal and which may be and preferably is transversely curved. This plate may have any desired form but, as illustrated, is gradually widened towards its rear end. The rear end is provided with a slightly upward extending flange 11. Disposed intermediate the ends of the plate 10 is an upwardly extending trigger releasing plate or abutment designated 12. This is held to the base by a wire 13 having two arms extended through the upper margin of the plate 12 and bent over against the plate, the lower end of each arm extending through a refolded portion 14 of the plate and through openings 15 in the base and then transversely across the base. This wire 13 formed as described, constitutes means for pivotally engaging the abutment plate 12 with the base 10 and permitting a slight backward and forward swinging movement of the abutment plate. Also attached to the plate 12 and projecting from the rear face of this plate is a wire loop 16, the forward ends of the wire being upwardly turned between the fold 14 and the body of the plate and then being extended through openings in the plate 12 and bent down on the rear face of the plate.

Mounted upon the forward end of the plate 10 are two upwardly and inwardly curved jaws 17, these being formed in any suitable manner but carried rigidly upon the plate. As illustrated, these jaws are formed of a single length of wire doubled upon itself, the bight of this wire 18 being disposed opposite the prongs 17 while the jaws or prongs 17 extend through openings 19 formed in the upwardly curved side margin of the plate 10. These jaws formed of the parts 17 and 18 are held in place by a wire 20 which, as shown in Figure 2, is doubled upon itself and has its bight portion 21 passing through an aperture 22 formed in one margin of the plate 10. The ends of the doubled wire 20 are bent around the prongs or jaws 17, as at 23, and then inwardly extended to form small prongs 24 projecting inward from one margin of the plate 10 and disposed beneath the jaws 17. The wire 20 at its bight portion 21 is not only extended through the aperture 22 but is formed to provide an eye 25 constituting a bearing at one end of a diagonally extending shaft 26. This shaft at its forward end carries upon it the movable prong or jaw 27 which is bent upward and inward and is arranged so that its pointed extremity is disposed in a plane between the two prongs or jaws 17. The shaft 26 extends diagonally rearward beneath the lower edge of the plate 12 and at its extremity is formed with an arm 28 which extends upward and inward and terminates in a hook 29. Surrounding the rear portion of the shaft 26 is a coiled spring 30, the forward end of which is attached at 31 to the base plate 10 while the rear end is extended upward to form an arm 32. The rear end of the shaft 26 is supported as in a bearing by means of a loop 33 formed in a wire 33ª which extends beneath the base plate and at one end is bent over at 34 upon the face of the base plate. The other end of the wire projects beyond the edge of the base plate at 35.

Extending at a slight angle to the arm 32 is an angular trigger 36 pivotally supported upon the base plate by means of a wire loop 37, one end of this trigger being bent to form a slight hook 38 adapted to engage over the loop 16 on the abutment plate. The other extremity of the trigger projects beyond the edge of the plate 10 and is oscillatably supported upon the projecting end 35 of the wire 33 by means of a wire wrapping 39.

In the operation of this trap, the trigger is set by pressing downward on the arm 32 until it has engaged beneath the hook 40. At this time, the loop 16 is engaged with the hook 38 and so long as the tripping plate 12 is in a vertical position or at right angles to the plane of the base and the loop is engaged over the hook 38, the spring 30 will be retained under tension. Of course, as soon as the trigger is released, the arm 32 will spring back to a vertical position. If, after the trigger is set, as above described, the jaw 27 is opened, the arm 28 will be turned so that the hook 29 will lie against the arm 32. Then when the trigger is released by an inward pressure on the abutment plate 12, the upward movement of the arm 32 under the action of the spring 30 will also move the arm 28 upward, which will rotate the shaft 26 and throw the jaw 27 violently toward the fixed jaws 17. Thus the animal will be gripped around his middle between the jaw 27 and the jaws 17, and the inward movement of the jaw 27 will cause the animal to be pressed against the prongs 24 which will thus greatly impede the animal from escaping between the jaws.

One of the particular points of advantage in this trap is that the trigger actuating abutment plate with the trigger mechanism can be set and the abutment latched in place before the trap is inserted in the burrow or hole. Then after the trap has been fully inserted, the jaw 27 may be opened into its operative position. This entirely eliminates the danger incident to ordinary traps where the jaws must be opened into operative position before the trigger can be set and then, if by any chance, the trigger is accidently released, the jaws close under the action of the spring and are liable to injure the fingers of the person setting the trap in place. After the trap is put in place and the jaws are opened, the floor of the trap or base may be sprinkled with earth so that the animal will not notice the trap when it enters. As soon as the animal tries to push forward in the burrow, however, as he will do, he will push against the abutment plate 12. This will release the trigger, as heretofore described, and the movable jaw will close upon the animal, gripping it between the two fixed jaws and the movable jaw.

Particular attention is called to the fact, which is one of the important features of my invention, that the jaw 27 need not be opened to its full extent but may be opened only partially or to an extent permitted by the diameter of the particular hole or burrow in which the trap is being set. In all other traps known to me, it is necessary that the movable jaw be fully opened before the jaw can be latched in its opened position or before the jaw can be set for actuation. In my construction, the jaw 27 may be moved from its fully opened position to any position towards the jaws 17 and then left. Then when the member 16 releases the trigger 36, the arm 32, under the action of the spring 30, will strike at some point in its arc of movement the hook or bent end 29 of the arm 28 and fully close the jaw. Thus the jaw may be left half-closed for small holes or fully opened for large holes and, in fact, the movable jaw may be initially disposed at any desired position from the fixed jaws. If it were necessary that the jaws be fully opened before the actuating mechanism could be set, the trap would not enter or could not be placed in any holes excepting very large ones. This is a very important point in my invention.

The purpose of the flange 11 is to strengthen the base plate of the trap and also to act as a thumb-hold. The base plate, as shown in Figures 1 and 2, is narrowed towards one end so as to permit the easy insertion of the trap into the hole.

It will be noted that almost all of the operative mechanism of the trap is disposed at that end of the trap which is at the entrance of the hole. It is the habit of the gopher, if any light enters his burrow, to immediately plug up the opening through which the light is entering. With the trap inserted in the burrow, the gopher will immediately take action to plug up the opening with dirt to keep out his two worst enemies, namely, the gopher snake and the weasel. To this end, he pushes a load of dirt ahead of him and he finally pushes hard enough to cause the dirt bearing against the tripping door or abutment 12 to trip the latch and permit the trap to spring closed. It is to be particularly noted, therefore, that all of the operative parts of the trap, except the shaft 26 and the jaw 27, are disposed in a direction away from the oncoming gopher and from the dirt pushed by him so that there is relatively little chance of dirt being pushed over the arm 32, the trigger 36 or the arm 28 to impede the action of the trap.

While I have described a particular embodiment of the trap and the particular detailed construction, it is to be understood that these details might be modified in many ways without in any way departing from the spirit of the invention and the principle thereof as defined in the appended claims.

What is claimed is:—

1. A trap, comprising a base plate, a pair of upwardly and inwardly curved fixed jaws at the forward end of the base plate, a rock shaft extending in a general longitudinal direction along the base plate and having an upwardly and inwardly curved jaw at its forward end confronting the fixed jaws, the rear end of the shaft having an upwardly and forwardly extending arm, a coiled spring surrounding the rear portion of the shaft anchored at its forward end to the base plate and at its rear end formed with a radial arm, the arm on the shaft extending transversely across the radial arm of the spring, a trigger mounted on the base plate at its rear end and having a hook engaging over the arm of the spring and holding the arm down against the tension of the spring, an abutment plate operatively engaged with the base plate and supported thereon in an approximately vertical position but having slight swinging movement rearward, and means on the abutment plate for engaging with and latching the trigger against relative movement, said means being constructed and arranged to release the trigger upon a rearward movement of the abutment plate.

2. A trap, comprising a transversely curved base plate, a pair of upwardly and inwardly curved fixed jaws at the forward end of the base plate and at one side thereof, a rock shaft extending diagonally along the base plate and having an upwardly and inwardly curved jaw at its forward end confronting the fixed jaws, the rear end of the rock shaft having an upwardly and forwardly extending arm, a coiled spring surrounding the rear portion of the shaft and anchored at its forward end to the base plate and at its rear end formed with a radial arm, the arm on the shaft being angularly bent to extend over the radial arm of the spring, a trigger oscillatably mounted on the base plate at its rear end and having at one end a hook engageable over the arm of the spring to thereby hold the arm down against the tension of the spring, an abutment plate swingingly mounted upon the base plate, the mounting of the abutment plate being constructed and arranged to support the abutment plate in an approximately vertical position but permit it to swing rearward, and a loop carried by the abutment plate for engaging with and latching the trigger against relative movement when the abutment plate is swung forward to its vertical position but acting to release the trigger upon a rearward movement of the abutment plate.

3. A trap, comprising a transversely curved base plate, the rear end of the base plate being upwardly curved, a pair of upwardly and inwardly curved fixed jaws at the forward end of the base plate and on one side thereof, a rock shaft extending diagonally along the base plate and having an upwardly and inwardly curved jaw at its forward end confronting the fixed jaws, the rear end of the shaft having an upwardly extending arm, a coiled spring surrounding the rear portion of the shaft and anchored at its forward end to the base plate and at its rear end formed with a radial arm, the arm on the shaft having a hook at its extremity adapted to overlie the radial arm of the spring, a V-shaped trigger at the rear end of the base plate, one arm of the trigger being oscillatably mounted upon the base plate and at its extremity having a hook, the other arm of the trigger extending forward and formed with a hook, and an abutment plate swingingly mounted upon the base plate for limited forward and rearward swinging movement, the rear face of the abutment plate adjacent its lower edge having a loop adapted to engage with the hooked end of the forwardly extending arm of the trigger and hold the trigger from movement until the abutment plate is moved rearward.

4. A trap of the character described, comprising a base plate, an upwardly and inwardly curved fixed jaw at one end of the base plate, a pivoted jaw at the like end of the base plate and confronting the first named jaw, a tripping plate mounted upon the base plate and extending upward therefrom and having limited movement, an element mounted upon the base plate and having an arm, a spring for urging the element in one direction, a jaw actuating member disposed in the path of movement of said element but entirely disconnected therefrom, means for latching the element in a retracted position against the tension of the spring, and means actuated by a movement of the tripping plate for releasing said latching means.

5. A trap of the character described, comprising a base plate, a fixed jaw on one side of the base plate, a movable jaw on the other side of the base plate and confronting the fixed jaw, an oscillatable shaft upon which the movable jaw is carried and extending toward the other end of the base plate and having an arm, a jaw actuating arm separate from but disposed beneath the arm on the shaft, a spring urging the second named arm in a direction to engage with the first named arm and rock the shaft to carry the movable jaw toward the fixed jaw, latching means adapted to hold the second named arm in a position against the tension of the spring, and animal actuated means for releasing said latching means.

6. A trap of the character described, including a base plate, a pair of fixed jaws on one side of the base plate, two inwardly projecting prongs disposed adjacent the lower ends of the fixed jaws, and a movable jaw on the other side of the base plate and confronting the first jaws, an oscillatable shaft upon which the movable jaw is carried and extending toward the other end of the base plate and having an arm, a jaw actuating arm separate from but disposed beneath the arm on the shaft, a spring urging the second named arm in a direction to engage with the first named arm and rock the shaft to carry the movable jaw toward the fixed jaw, latching means adapted to hold the second named arm in a position against the tension of the spring, and animal actuated means for releasing said latching means.

7. A trap including a base plate, two opposed jaws mounted thereon, one of the jaws being freely movable from or toward the other jaw, spring actuated means movable in one direction under the action of its spring and operatively engaging the movable jaw to close it, said spring actuated means being entirely separate from the movable jaw whereby to permit the movable jaw to be shifted into more or less open position with relation to the fixed jaw, means for latching the spring actuated means with its spring under tension, and animal actuated means for releasing said latching means.

8. A trap including a base plate, a fixed jaw at one side of the base plate, a pivoted jaw at the opposite side of the base plate from the fixed jaw, the pivoted jaw being manually shiftable into any one of a plurality of positions relative to the fixed jaw, a spring retracted member separate from but constructed and arranged to operatively engage the movable jaw as it moves under the action of the spring to cause the closing of the movable jaw, means for latching the spring actuated member with its spring under tension, an animal actuated tripping plate, and means actuated by a movement of the tripping plate from normal position for releasing said latching means.

9. A trap including a base plate, a pair of fixed jaws disposed on one side of one end of the base plate, a movable jaw opposed to the fixed jaw and having a shaft extending longitudinally of the base plate, this shaft having at one end an arm remote from the pivoted jaw, the shaft and its arm being movable freely in a direction toward or from the fixed jaw, a spring loosely surrounding the shaft anchored at one end to the base plate and at the other end having an angularly extending arm normally disposed beneath the arm on the base plate, latching means directly engaging with and latching the arm on the spring in a position approximately parallel to the base plate and against the tension of the spring, and animal actuated means releasing said latching means.

10. A trap of the character described, including laterally opposed jaws, one of the jaws being movable toward or from the other jaw, a jaw actuating member separate from the jaw itself but operatively engaging the jaw upon a movement in one direction, a spring urging the member in a direction to operatively engage the movable jaw and projected toward the other jaw, latching means directly engaging the jaw actuating member and when engaged holding it in a position with the spring under tension, animal actuated means for releasing said latching means, and means permitting the movement of the movable jaw toward or from the other jaw under manual manipulation independently of the jaw actuating member when the jaw actuating member is latched.

JOHN TENBROOK.